United States Patent
Chen

(10) Patent No.: US 11,200,114 B2
(45) Date of Patent: Dec. 14, 2021

(54) SYSTEM AND METHOD FOR FACILITATING ELASTIC ERROR CORRECTION CODE IN MEMORY

(71) Applicant: Alibaba Group Holding Limited, Grand Cayman (KY)

(72) Inventor: Jian Chen, San Jose, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/821,548

(22) Filed: Mar. 17, 2020

(65) Prior Publication Data

US 2021/0294692 A1 Sep. 23, 2021

(51) Int. Cl.
*G06F 11/10* (2006.01)
*G06F 9/30* (2018.01)
(Continued)

(52) U.S. Cl.
CPC ...... *G06F 11/1044* (2013.01); *G06F 9/30189* (2013.01); *G06F 11/076* (2013.01);
(Continued)

(58) Field of Classification Search
CPC ............. G06F 11/1044; G06F 9/30189; G06F 11/076; G06F 11/1032; G06F 11/106; G06F 11/1068; G06F 11/3037
See application file for complete search history.

(56) References Cited

U.S. PATENT DOCUMENTS 3,893,071 A 7/1975 Bossen
4,562,494 A 12/1985 Bond
(Continued)

FOREIGN PATENT DOCUMENTS

JP 2003022209 1/2003
JP 2011175422 9/2011
(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Guy J Lamarre
(74) *Attorney, Agent, or Firm* — Shun Yao; Park, Vaughan, Fleming & Dowler LLP

(57) ABSTRACT

A system is provided for performing error correction in memory. During operation, the system can receive a memory access request from a host processor. The system can then compare a memory address specified in the memory access request with a set of entries in an error correction code (ECC) mapping table. In response to the system determining that the memory address corresponds to at least one entry in the ECC mapping table, the system may determine, based on value in the counter field, whether the memory address belongs to a first portion or a second portion of the address range specified in the ECC mapping table entry. The system can then select a current ECC mode when the memory address belongs to the first portion; and select a previous ECC mode when the memory address belongs to the second portion. The system may then process the memory access request based on the selected ECC mode.

20 Claims, 9 Drawing Sheets

(51) Int. Cl.
  *G06F 11/07*  (2006.01)
  *G06F 11/30*  (2006.01)
(52) U.S. Cl.
  CPC ........ *G06F 11/106* (2013.01); *G06F 11/1032* (2013.01); *G06F 11/1068* (2013.01); *G06F 11/3037* (2013.01)

(56) References Cited

U.S. PATENT DOCUMENTS

| | | |
|---|---|---|
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,825,937 B2 | 9/2014 | Atkisson |
| 8,868,825 B1 | 10/2014 | Hayes |
| 8,904,061 B1 | 12/2014 | O'Brien, III |
| 8,949,208 B1 | 2/2015 | Xu |
| 9,015,561 B1 | 4/2015 | Hu |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 9,607,631 B2 | 3/2017 | Rausch |
| 9,747,202 B1 | 8/2017 | Shaharabany |
| 9,852,076 B1 | 12/2017 | Garg |
| 9,875,053 B2 | 1/2018 | Frid |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,318,467 B2 | 6/2019 | Barzik |
| 10,361,722 B2 | 7/2019 | Lee |
| 10,437,670 B1 | 10/2019 | Koltsidas |
| 10,642,522 B2 | 5/2020 | Shu |
| 10,649,657 B2 | 5/2020 | Zaidman |
| 2001/0032324 A1 | 10/2001 | Slaughter |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0161890 A1 | 10/2002 | Chen |
| 2003/0074319 A1 | 4/2003 | Jaquette |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0250756 A1* | 10/2007 | Gower ................... H05K 1/117 714/763 |
| 2007/0283081 A1 | 12/2007 | Lasser |
| 2007/0283104 A1* | 12/2007 | Wellwood ............. G06F 11/106 711/154 |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0163033 A1* | 7/2008 | Yim ................... H03M 13/3715 714/785 |
| 2008/0301532 A1 | 12/2008 | Uchikawa |
| 2009/0006667 A1 | 1/2009 | Lin |
| 2009/0089544 A1 | 4/2009 | Liu |
| 2009/0113219 A1 | 4/2009 | Aharonov |
| 2009/0125788 A1* | 5/2009 | Wheeler ............... G06F 11/106 714/764 |
| 2009/0183052 A1 | 7/2009 | Kanno |
| 2009/0282275 A1 | 11/2009 | Yermalayeu |
| 2009/0287956 A1 | 11/2009 | Flynn |
| 2009/0307249 A1 | 12/2009 | Koifman |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0292538 A1 | 12/2011 | Haga |
| 2011/0299317 A1 | 12/2011 | Shaeffer |
| 2011/0302353 A1 | 12/2011 | Confalonieri |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |

(56) References Cited

U.S. PATENT DOCUMENTS

| | | |
|---|---|---|
| 2012/0147021 A1 | 6/2012 | Cheng |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1* | 12/2012 | Moyer ............ H03M 13/13 714/763 |
| 2012/0331207 A1 | 12/2012 | Lassa |
| 2013/0013880 A1 | 1/2013 | Tashiro |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |
| 2013/0238955 A1 | 9/2013 | D'Abreu et al. |
| 2013/0254622 A1 | 9/2013 | Kanno |
| 2013/0318283 A1 | 11/2013 | Small |
| 2013/0318395 A1 | 11/2013 | Kalavade |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0294684 A1 | 10/2015 | Qjang |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077749 A1 | 3/2016 | Ravimohan |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0321002 A1 | 11/2016 | Jung |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0004037 A1* | 1/2017 | Park ............... G06F 11/1068 |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0143780 A1 | 5/2018 | Cho |
| 2018/0150640 A1 | 5/2018 | Li |
| 2018/0165038 A1 | 6/2018 | Authement |
| 2018/0167268 A1 | 6/2018 | Liguori |
| 2018/0173620 A1 | 6/2018 | Cen |
| 2018/0188970 A1 | 7/2018 | Liu |
| 2018/0189182 A1 | 7/2018 | Wang |
| 2018/0212951 A1 | 7/2018 | Goodrum |
| 2018/0226124 A1 | 8/2018 | Perner |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |

(56) References Cited

U.S. PATENT DOCUMENTS

| | | |
|---|---|---|
| 2019/0065085 A1 | 2/2019 | Jean |
| 2019/0073261 A1* | 3/2019 | Halbert ................ G06F 3/0679 |
| 2019/0073262 A1 | 3/2019 | Chen |
| 2019/0087115 A1 | 3/2019 | Li |
| 2019/0087328 A1 | 3/2019 | Kanno |
| 2019/0171532 A1 | 6/2019 | Abadi |
| 2019/0205206 A1 | 7/2019 | Hornung |
| 2019/0227927 A1 | 7/2019 | Miao |
| 2019/0272242 A1 | 9/2019 | Kachare |
| 2019/0278654 A1 | 9/2019 | Kaynak |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0097189 A1 | 3/2020 | Tao |
| 2020/0159425 A1 | 5/2020 | Flynn |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"> FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

* cited by examiner

SYSTEM AND METHOD FOR FACILITATING ELASTIC ERROR CORRECTION CODE IN MEMORY

BACKGROUND

Field

This disclosure is generally related to the technical field of data storage. Specifically, this disclosure is related to a system and method for facilitating elastic error correction code in memory.

Related Art

The memory capacity in modern servers have been continuously increasing due to an increasing demand for server applications, e.g., web applications, web services, etc., that are resource intensive. In addition, the modern servers are expected to provide a reliable service. It is expected that the server-level Reliability, Availability and Serviceability (RAS) is sufficient to meet the requirements of cloud service providers in terms of Total Cost of Ownership (TCO) and of customer Service-Level Agreement (SLA). There can be several factors that affect the RAS level, one of the dominant factors being the occurrence of soft errors in the server's dynamic random access memory (DRAM) devices. Soft errors occur in memory system when cosmic rays or particles with certain electrical charges hit a memory cell, thereby causing the cell to change its state to a different value. However, the memory cell is functional and there is no damage caused to the physical structure of the memory cell.

In order to improve the RAS level of the modern servers and to protect DRAM devices against the occurrence of soft errors, several error correction techniques have been integrated into memory devices in the modern servers. In the following paragraphs, some of the conventional error correction techniques and the challenges encountered by these error correction techniques are addressed.

Most of the modern server-class DRAMs are typically protected by standard error correction codes (ECC) that has the capability of Single-Error Correction and Double Error Detection (SECDED). Previously, such standard SECDED ECC provided reliable operation of memory devices, but in recent years this standard SECDED ECC has been incapable of meeting the high level of RAS requirements of the modern servers. Such poor performance of the standard SECDED ECC is due to the following factors. First, the memory capacity in modern servers has been continuously increasing. Specifically, the memory capacity in memory systems is increased by densely packing a high number of memory devices, e.g., DRAMs. Such dense packing of memory devices results in an increase in a percentage of multi-bit errors. Since the standard SECDED ECC is only capable of correcting a single bit error, it does not provide sufficient error protection when the DRAM devices are subject to multi-bit errors.

Second, with the on-going evolution of Double Data Rate (DDR) memories, there has also been a continuous drop in the operating voltage of DRAM devices. Table 1 below shows the different DDR versions and their corresponding operating voltages.

TABLE 1

Operating voltages of different DDR versions

| DDR version | Operating voltage |
| --- | --- |
| DDR3 | 1.5 V-1.65 V |
| DDR4 | 1.2 V-1.4 V |
| DDR5 | 1.1 V |

With the decrease in the operating voltage of the DRAM devices, the noise margin is also lowered, thereby causing the DRAM devices to be susceptible to multi-bit soft errors that cannot be sufficiently corrected by the standard SECDED ECC. Such a poor performance of the standard SECDED ECC in modern servers has lead to the development of advanced error correction techniques to ensure server reliability.

One error correcting technique uses remapping or re-organization of bits of an ECC word, to correct bit errors. The ECC word includes both data bits and check bits. The error correcting technique technique is suitable for a scenario when soft errors are clustered. The error correcting technique technique scatters the bits of the ECC word across multiple memory chips. For example, instead of storing an entire cache line in one DRAM device, the error correcting technique technique re-arranges the data in the cache line by spreading the data across multiple DRAM devices. Hence, a failure of any single memory chip would affect only one ECC bit per word. However, the error correcting technique is not effective when the soft errors are uniformly distributed across the memory chips.

Another existing method for correcting multi-bit errors is full or partial memory mirroring. In this technique, a range of memory or half of the memory is duplicated in the DRAM available in the memory system. When the ECC is incapable of correcting the errors in a DRAM device, the mirrored or duplicated copy of data is used for processing the subsequent data access requests. Such a mirroring technique is capable of providing robust error correction, this is because even if the data bits is a portion of memory is completely corrupted, the system can use the uncorrupted data bits in the mirrored copy of this portion of the memory. However, this technique reduces the effective memory capacity by half resulting in an expensive RAS feature.

Due to the above-mentioned drawbacks associated with different error correction techniques, some challenges still remain in designing an effective error correction technique that is capable of correcting multi-bit errors and providing a high level RAS.

SUMMARY

According to one embodiment of the present disclosure, a system for performing error correction in memory is provided. During operation, the system can receive a memory access request from a host processor. The system can then compare a memory address specified in the memory access request with a set of entries in an error correction code (ECC) mapping table. In response to the system determining that the memory address corresponds to at least one entry in the ECC mapping table, the system may perform the following operations: determining, based on a value in the counter field, whether the memory address belongs to a first portion or a second portion of the address range specified in the ECC mapping table entry; selecting a current ECC mode when the memory address belongs to the first portion; and selecting a previous ECC mode when the memory address belongs to the second portion. The system may then process the memory access request based on the selected ECC mode.

In a variation on this embodiment, each entry in the ECC memory mapping table can include: a start address field, an end address field, a previous ECC mode field, a current ECC mode field, and a counter field.

In a variation on this embodiment, the previous ECC mode and the current ECC mode use a class of cyclic error correcting codes that is capable of performing: a 4-bit error correction and 5-bit error detection; a 5-bit error correction and 6-bit error detection; and a 6-bit error correction and 7-bit error detection.

In a variation on this embodiment, in response to determining that the memory address is not included in the ECC mapping table, selecting a default ECC mode. The default ECC mode represents a Hamming code with 64 bits data and 8 bit parity code.

In a further variation on this embodiment, the system can use a counter field in the ECC mapping table entry to track a boundary separating the address range into the two regions: the first portion of the address range and the second portion of the address range. The address range is defined by a start address and an end address specified in the ECC mapping table entry.

In a variation on this embodiment, the memory in the system can include a dynamic random access memory (DRAM).

In further variation on this embodiment, the system can determine that the memory access request is a write request when the memory address is the last address in the first portion. Next the system can in response to determining that the memory access request is the write request, update the ECC mapping table by: setting a write ECC mode field in the ECC mapping table to the current ECC mode and increment a value in the counter field of the ECC mapping table entry.

According to another embodiment of the present disclosure, a system for performing error correction in memory by performing memory scrubbing and ECC mapping table update is provided. During operation, the system can monitor an ECC decoding statistics to identify a set of intensities of soft errors in different address ranges in memory. The system can in response to determining that an intensity of soft errors in an address range in memory is greater than at least one threshold in a set of thresholds: read an ECC mapping table. Further, the system can in response to determining that the address range is fully or partially included in an entry of the ECC mapping table, prioritize memory scrubbing when the address range is not completely protected with an ECC mode specified in a current mode field of the entry in the ECC mapping table. The system can then update the ECC mapping table.

In a variation on this another embodiment, the system can update the ECC mapping table by: updating a previous ECC mode field in the entry of the ECC mapping table with a mode specified in the current mode field; setting, based on the threshold, the current mode field to a new mode; and resetting a counter field in the entry of the ECC mapping table. The new mode has a higher strength than the mode specified in the updated previous ECC mode field.

In a further variation on this another embodiment, the system can in response to determining that the address range is not included in any entry of the ECC mapping table: add a new entry to the ECC mapping table; set a previous ECC mode field in the new entry to a default mode; set, based on the threshold, the current ECC mode field in the new entry to a new mode, and reset a counter field in the entry of the ECC mapping table.

In a further variation on this another embodiment, the set of thresholds includes a first threshold, a second threshold, and a third threshold. When the system determines that the intensity of soft errors exceeds the first threshold, the current ECC mode field is set to mode 1. When the system determines that intensity of soft errors exceeds the second threshold, the current ECC mode field is set to mode 2. Next, when the system determines that the intensity of soft errors exceeds the third threshold, the current ECC mode field is set to mode 3.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the principles and features disclosed herein.

Overview

Figure 1A:
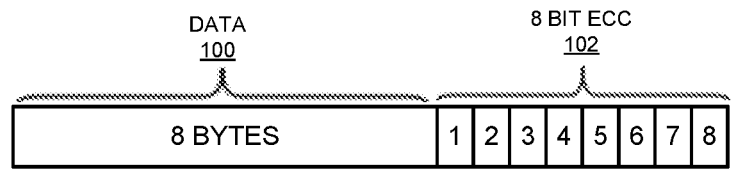
FIG. 1A shows a conventional EEC word used in a standard SECDED ECC, in accordance with the prior art.

In recent years, the idea of merging different levels of error correction capabilities in a single system has been explored. One such technique that uses different levels of error correction capabilities is Morphable ECC (MECC). FIG. 1A shows a conventional EEC word used in standard SECDED ECC, in accordance with the prior art. Standard SECDED operate at 8 byte granularity, i.e., 8 byte data block (100) has 8 ECC bits (102). In other words, with every 64-bit of payload data SECDED uses 8-bits of ECC.

MECC technique proposes to use SECDED on 64 byte block granularity instead of the conventional 8 byte block granularity. Further, in addition to the conventional SECDED with 64 byte block granularity, MECC provides another error correcting capability on the 64 byte block granularity. Specifically, MECC provides an error correction mode that is capable of correcting 6-bit errors and is denoted as ECC-6. ECC-6 provides a better error correction capability than the conventional SECDED on a 64 byte block granularity.

Figure 1B:
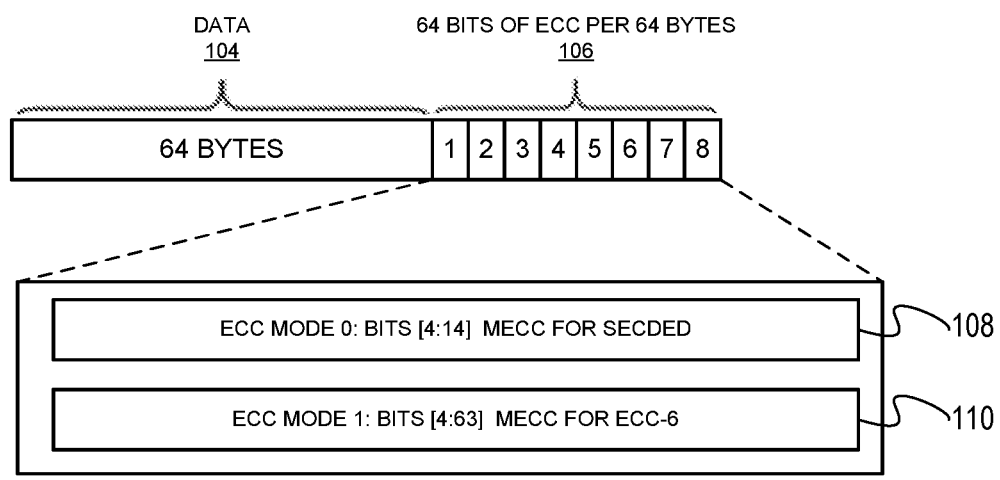
FIG. 1B shows two ECC modes used in an existing MECC technique, in accordance with the prior art.

The MECC derives its 6-bit ECC from the standard SECDED. Specifically, for a 64 byte block granularity the 8 ECC bits used in the standard SECDED on 8 byte block granularity are merged to provide 64 bits ECC for a 64 byte block. Hence, the 64-bits of ECC can be sufficient to support the 6-bit error correction code, ECC-6. Since each mode in MECC may use different combination of the ECC bits for each level of error protection, MECC uses the left-most four bits in the ECC field as the mode bits. These mode bits are used to identify an ECC mode or level of error protection used for a current 64 byte data block. FIG. 1B shows two modes used in an existing MECC technique, in accordance with the prior art. Each ECC word includes 64 bytes of data block (104) and 64-bits of ECC (106). MECC uses the 64 bits of ECC to perform error correction using ECC mode 0 (108) or ECC mode 1 (110).

MECC was specifically designed for improving RAS feature on mobile computing platforms. Since mobile computing devices come with a limited battery power, it was important to reduce their energy consumption to provide a longer period of operation with battery power. A process that consumes a significant portion of the available battery power on mobile computing platforms is a refreshing operation performed on DRAM. Reducing the number of refreshes performed on DRAMs would save the battery power. Therefore, MECC was designed to reduce the number of DRAM refreshing by using a stronger error correction mode, i.e., ECC-6, thereby also reducing the DRAM power consumption for mobile systems.

Although MECC provides a better error protection technique compared to the standard SECDED, the performance of MECC deteriorates when it is used for improving the reliability of DRAMs in data centers. In the following paragraphs some of the inherent drawbacks associated with using the MECC error correction technique have been addressed.

Although standard SECDED is capable of correcting just one bit errors, the error correction process or the ECC checking process can be overlapped with the transfer of 8 byte data, thereby partially hiding the ECC checking latency. But MECC performs ECC checking only after the 64 bytes of data have been transferred. MECC performs such ECC checking irrespective of the mode used, i.e., either SECDED or ECC-6. Therefore, MECC does not hide the ECC checking latency during the transfer of a cache line, thereby incurring an increase in memory access latency. Moreover, performing ECC checking on 64 bytes of data block takes longer time to complete than performing ECC checking on 8 bytes of data block, thereby causing additional tens of cycles of latency when accessing a cache line sized data in DRAM.

Further, MECC is exclusively a hardware solution for correcting errors in DRAM. While this can be a desirable feature in certain applications scenarios, it proved to be disadvantageous for data center management systems. One of the reasons why MECC is incompatible with data center management systems is that data centers need to be aware of soft-error rates of the system to take proactive actions. The proactive actions can include: disabling the failing DRAM Dual in-line memory module (DIMM), or preventing service disruption by migrating the applications away from a failing node. Since MECC is a hardware mechanism, it completely shields soft-error rate information from the data center management system, thereby causing the data center management system to be affected by abrupt service disruption.

Moreover, in MECC, the mode bits used for identifying the ECC mode could also be subject to soft errors. MECC provides a solution for addressing such soft errors in the modes bits by duplicating the mode bits 4 times. However, this solution is only capable of correcting one-bit errors in the mode bits. Therefore, when two-bit errors occur in the mode bits, MECC can be unable to identify a correct ECC mode to be used. Without a correct identification the ECC mode to be used no error correction would take place, thereby leading to accumulation of soft errors in memory which would cause a severe degradation in the system performance. Therefore, due to the above-mentioned drawbacks of MECC, the performance of MECC deteriorates when it is used for improving the reliability of DRAM in data centers.

Table 2 below provides a comparison between the MECC error correction technique and the elastic ECC technique proposed in the present disclosure.

TABLE 2

Comparison between MECC and Elastic ECC

| MECC | ELASTIC ECC |
| --- | --- |
| Can support only two modes: SECDED and ECC-6 | Is capable of supporting four modes, thereby proving a better flexibility in controlling the ECC. |
| Since MECC can support only two modes, moderate soft error intensities are managed by using strong ECC-6, which need several cycles to perform the encode and decode operations. Thereby, increasing the memory access latency overhead. | Since Elastic ECC can support 4 modes, it provides less memory access latency overhead for moderate soft error intensities. Furthermore, elastic ECC provides a smooth and graceful trade-off between memory access latency overhead and ECC protection levels. |
| MECC stores ECC mode information in DRAM, hence can be susceptible to soft errors. | Stores ECC mode information in memory registers of the memory controller, which has better resilience to soft errors when compared with DRAM. Hence, elastic ECC provides a better DRAM reliability than MECC. |

TABLE 2-continued

Comparison between MECC and Elastic ECC

| MECC | ELASTIC ECC |
|---|---|
| Does not provide any control on mapping of ECC and address range in memory. | Is capable of allowing the operating system to control the mapping of ECC to a given address range in memory. Such control on mapping can allow the operating system to take proactive actions before the soft error intensities increase beyond a threshold value. |

Further, unlike full or partial memory mirroring, the present disclosure using elastic ECC does not incur memory capacity overhead, thereby reducing the server cost when performing multi-bit error correction. Moreover, the memory mirroring method involves additional memory writes which impacts the memory bandwidth. The present disclosure does not include such additional memory writes, hence not impacting the memory bandwidth.

According to one embodiment of the present disclosure, a system for performing error correction in memory is provided. During operation, the system can receive a memory access request from a host processor. The system can then compare a memory address specified in the memory access request with a set of entries in an error correction code (ECC) mapping table. In response to the system determining that the memory address corresponds to at least one entry in the ECC mapping table, the system may perform the following operations: determining, based on value in the counter field, whether the memory address belongs to a first portion or a second portion of the address range specified in the ECC mapping table entry; selecting a current ECC mode when the memory address belongs to the first portion; and selecting a previous ECC mode when the memory address belongs to the second portion. The system may then process the memory access request based on the selected ECC mode According to another embodiment of the present disclosure, a system for performing error correction in memory by performing memory scrubbing and ECC mapping table update is provided. During operation, the system can monitor an error correction code (ECC) decoding statistics to identify a set of intensities of soft errors in different address ranges in memory. The system can in response to determining that an intensity of soft errors in an address range in memory is greater than at least one threshold in a set of thresholds, read an ECC mapping table. Further, the system can in response to determining that the address range is fully or partially included in an entry of the ECC mapping table, prioritize memory scrubbing when the address range is not completely protected with an ECC mode specified in a current mode field. The system can then update the ECC mapping table.

Furthermore, the present disclosure is capable of addressing memory reliability issues in a flexible and cost effective manner. The system can expand the size of the data blocks that ECC bits can protect from 64 bits to 512 bits or 64 bytes, e.g., a cache line size in X86 systems. Further, the system can use the aggregated 64 bit ECC bits for multi-bit error correction of the cache line block. In addition, the system includes an integrated memory controller in a central processing unit (CPU) by introducing an ECC mapping table that can include address ranges and corresponding ECC modes. The system is capable of correcting multi-bit errors at the cache block level without incurring additional overhead in memory capacity. The system is also capable of allowing the co-existence of multiple ECCs and can provide flexibility on the type of ECC modes. Further, the system can also provide flexibility on protecting different memory regions; hence the system is capable of adapting to various application demands.

Elastic Error Correction Code Modes

Unlike MECC, the present disclosure is capable of providing additional programmable ECC protection modes for 64 byte cache line data. The system can use the default Mode 0, which is a conventional <72,64> Hamming code with 64-bit data and 8-bit parity code (see FIG. 1A). This ECC mode provides SECDED capability on 64-bit data granularity. When the system uses Mode 0, encoding and decoding operations can be fast. The system can also pipeline the encoding and decoding operations with DRAM accesses, thereby hiding most of the ECC decoding/encoding overhead.

Figure 2:
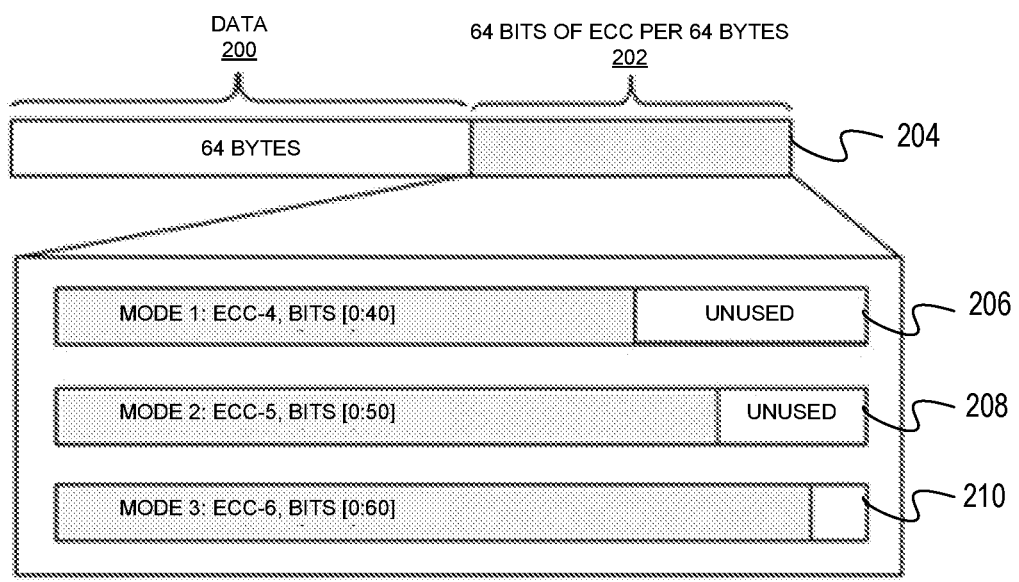
FIG. 2 shows three different exemplary ECC modes, according to one embodiment of the present disclosure.

FIG. 2 shows three different exemplary ECC modes, according to one embodiment of the present disclosure. In addition to the conventional SECDED, the present disclosure can provide three additional modes: Mode 1 (206), Mode 2 (208), and Mode 3 (210). These additional ECC modes can support up to 6 bit error correction and 7 bit error detection at the cache line level. The system can use these three modes to protect the 64 byte data block 200 by merging together the corresponding 8 of the 8-bit parity codes. Further, the system can use a class of cyclic error correcting codes that are capable of correcting random multi-bit errors, e.g., Bose-Chaudhuri-Hocquenghem (BCH) code. For example, when using the BCH code for correcting t errors and detecting t+1 errors in d-bit data, the constraints shown in Table 3 can be satisfied.

TABLE 3

BCH code constraints

| Length of code word | $[(t * m) + 1]$ bits |
|---|---|
| Length of data block, d | $d < 2^m - 1$ |

Based on the constraints listed in Table 3, the system may use different error correction levels with 64 bytes of data block granularity. For Mode 1 (206) the system can use 41 ECC bits for error correction which has the capability of correcting 4-bit errors and detecting 5-bit errors. The remaining bits in the ECC field are unused. Similarly, for Mode 2 (208) the system may use 51 ECC bits for 5-bit error correction and 6-bit error detection. For Mode 3 (210), the system can use 61 ECC bits for 6-bit error correction and 7-bit error detection. In a memory system, the soft-errors can be "localized" or "clustered", to address such soft-errors the system can program the selection of different ECC modes to address such soft-errors. Table 4 below shows the different ECC modes with their corresponding ECC bits, error correction, and error detection capability. With these 4 modes, the system can be capable of providing different levels of granularity, protection strength, and robustness.

TABLE 4

Different ECC modes used in elastic error correction technique

| Mode | Number of ECC bits | Capable of correcting | Capable of detecting |
| --- | --- | --- | --- |
| 0 | 8 bits | 1-bit error | 1-bit error |
| 1 | 41 bits | 4-bit errors | 5-bit errors |
| 2 | 51 bits | 5-bit errors | 6-bit errors |
| 3 | 61 bits | 6-bit errors | 7-bit errors |

System Architecture and Operation

Figure 3:
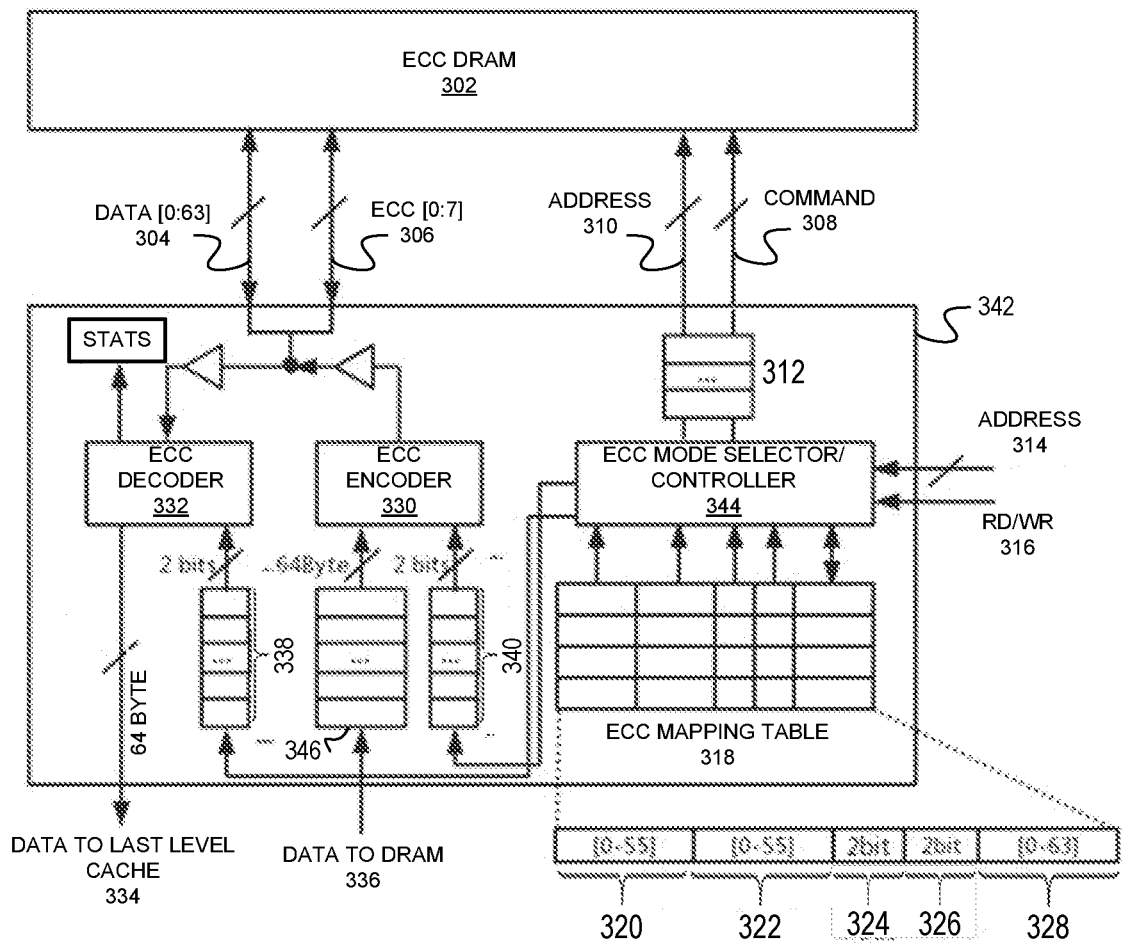
FIG. 3 shows an exemplary elastic error correction system architecture, in accordance with an embodiment of the present disclosure.

FIG. 3 shows an exemplary elastic error correction system architecture, in accordance with an embodiment of the present disclosure. System 300 shown in FIG. 3 can include building blocks for facilitating an elastic ECC technique; these building blocks are described below. Memory controller 342 includes an encoder 330 for encoding data 336 from last level cache 334 to DRAM 302, and a decoder 332 for decoding data from DRAM 302 to last level cache 334. Memory controller 342 can include additional features to encoder 330 and decoder 332, so that they can support the three additional ECC modes, i.e., Mode 1, Mode 2, and Mode 3, in addition to the default Mode 0. Memory controller 342 can support an ECC DRAM 302 with 64-bit bus 304 for transferring data and 8-bit bus 306 for transferring the corresponding ECC bits.

Further, system 300 can include additional hardware for an ECC mapping table 318 in memory controller 342. Each entry in ECC mapping table 318 contains the following fields: a 56-bit start address 320, a 56-bit end address 322, a 2-bit previous ECC mode 324, a 2-bit current ECC mode 326, and a 64-bit counter 328. System 300 can allow an operating system to have access to these fields in each entry of ECC mapping table 318 as model specific registers (MSRs). The operating system can read or write to ECC mapping table 318 using instructions rdmsr or wrmsr, respectively. Such a feature allows system 300 to provide flexibility in controlling the ECC.

Start address 320 and end address 322 correspond to a 64 byte cache line address; hence they are 56-bit wide. The address range between start address 320 and end address 322 indicate a physical address range which is to be protected by one of the 4 ECC modes. Memory controller 342 can use counter 328 to track a boundary that separates an address space defined by start address 320 and end address 322 into two regions. A first region in the address space may use current ECC mode 326 and a second region in the address space may use previous ECC mode 324.

Memory controller 342 can further include an ECC mode selector or controller 344. ECC mode controller 344 may continuously monitor the entries in ECC mapping table 318 and may determine an ECC mode for a current DRAM access request. ECC mode controller 344 can also provide an interface that can be used by the operating system to program ECC mapping table 318. Memory controller 342 may enable ECC mode controller 344 to receive an incoming address 314 and a read (RD)/write (WR) command 316 from a host processor or core. ECC mode controller 344 may then translate incoming address 314 into a corresponding DRAM 302 row and column address 310. Further, ECC mode controller 344 can translate RD/WR command 316 into a corresponding DRAM command 308. Address 310 and command 316 are queued in buffer 312 before sending to DRAM 302.

In addition, based on the entries in ECC mapping table 318, ECC mode controller 344 can generate read ECC mode bits and write ECC mode bits. ECC mode controller 344 can send the write ECC mode bits to a buffer 340 with a same number of entries as a buffer 346 that holds the corresponding incoming 64 byte cache line data to be written to DRAM 302. Alternatively, ECC mode controller 344 can queue the read ECC mode bits into a similar buffer 338 that feeds to ECC decoder 332. Memory controller 342 can dequeue the read ECC mode bits whenever a 64 byte data from DRAM 302 has been decoded by ECC decoder 332. Memory controller 342 can use the read ECC mode bits and write ECC mode bits in their corresponding buffers 338 and 340 to synchronize with data traffic coming from DRAM 302 or going out to DRAM 302.

Exemplary Methods for Facilitating Elastic Error Correction

Figure 4A:
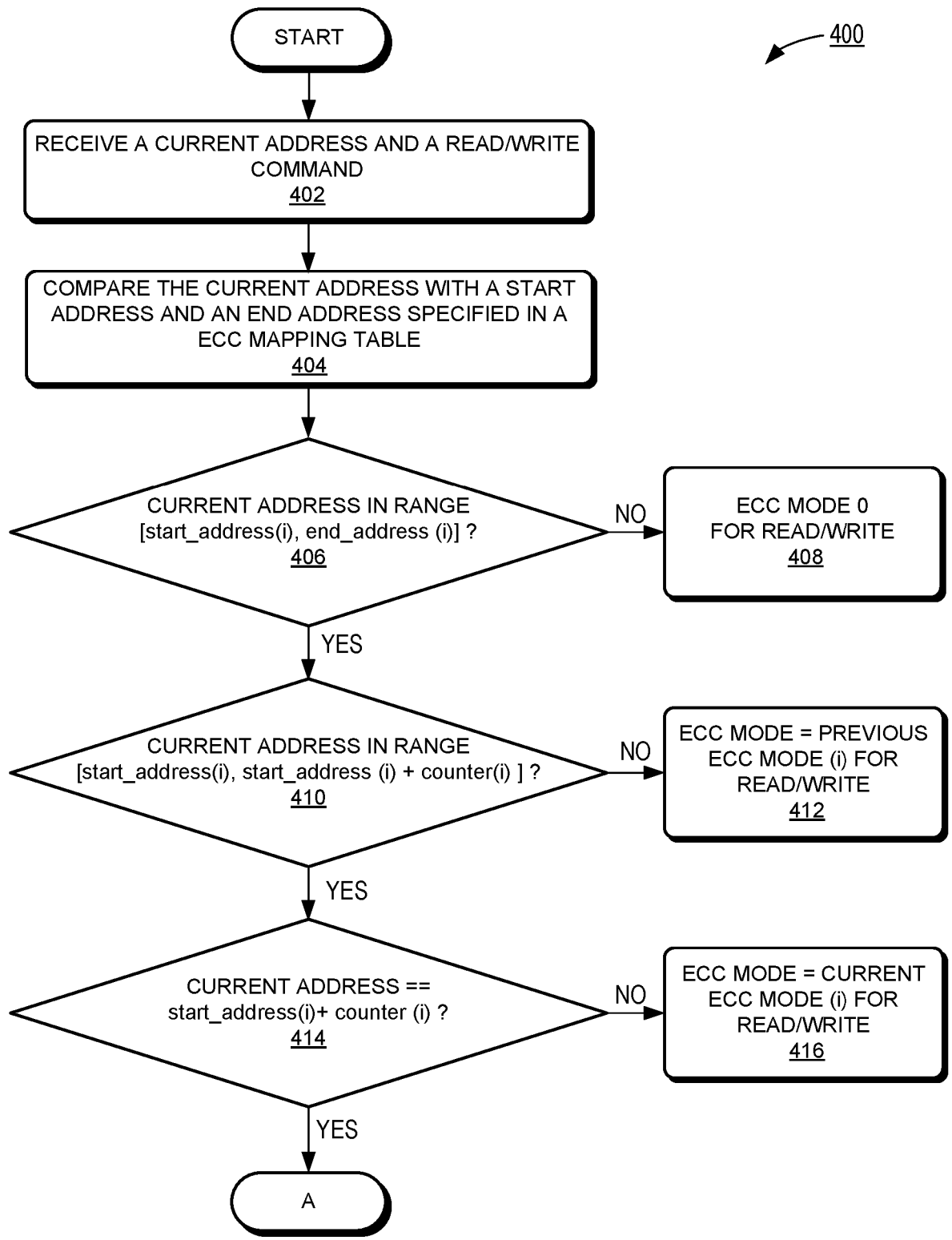
FIG. 4A presents a flowchart illustrating an exemplary process for performing elastic error correction in memory, in accordance with an embodiment of the present disclosure.

FIG. 4A presents a flowchart 400 illustrating an exemplary process for performing elastic error correction in memory, in accordance with an embodiment of the present disclosure. Flowchart 400 in FIG. 4 describes a process for determining an ECC mode from a current address and entries in the ECC mapping table. During operation, the system may first receive the current address and a RD/WR command from a host processor or a core (operation 402). The system can compare the received current address with each entry in the ECC mapping table (operation 404). Let [start_address(i), end_address(i)] represent an address range specified in an $i^{th}$ entry in the ECC mapping table, where i represents an index of a matching entry. The start_address(i) and end_address(i) correspond to the start address 320 and end address 322 fields in the $i^{th}$ entry of the ECC mapping table.

Based on the comparison (operation 404) the system may determine whether the current address belongs to any of the address ranges specified in the ECC mapping table (operation 406). When the system determines that the current address is not included in any of the address ranges specified in the ECC mapping table then the system can select a default ECC mode 0 (operation 408). The default ECC mode 0 represents a <72, 64> Hamming code.

When the system determines that the current address is included in an $i^{th}$ address range [start_address(i), end_address(i)] specified in the ECC mapping table, then the system may further determine if the current address is included in the address range [start_address(i), start_address(i)+counter(i)] which can correspond to a first portion of the $i^{th}$ address range (operation 410). If the condition in operation 410 is not satisfied, then the system can indicate that the current address is still using an ECC mode that was previously used (operation 412). In other words, the system can detect that the ECC mode specified in the current ECC mode field of the $i^{th}$ entry in the ECC mapping table has not been applied to the data corresponding to the current address.

If the system determines that the condition in 410 is satisfied then the system can further compare the current address with [start_address(i)+counter(i)] (operation 414). When the condition in 414 is not satisfied (i.e., the current address is not on the boundary between the first and the second portions of the $i^{th}$ address range) then the system may set the ECC mode for the current address to a current ECC mode specified in the current ECC mode field of the $i^{th}$ entry in the ECC mapping table.

Note that the system can use the counter to track a boundary that separates the address space defined by [start_address(i), end_address(i)] into two regions. When the system determines that the current address belongs to the first region or first portion, then the ECC mode can be set to the current ECC mode. Alternatively, the system can use the previous ECC mode when the current address belongs to the second region or second portion of the address space. With the integration of such a counter in the ECC mapping table, the system can be capable of providing a smooth transition between different ECC modes without causing disruption in service.

Figure 4B:
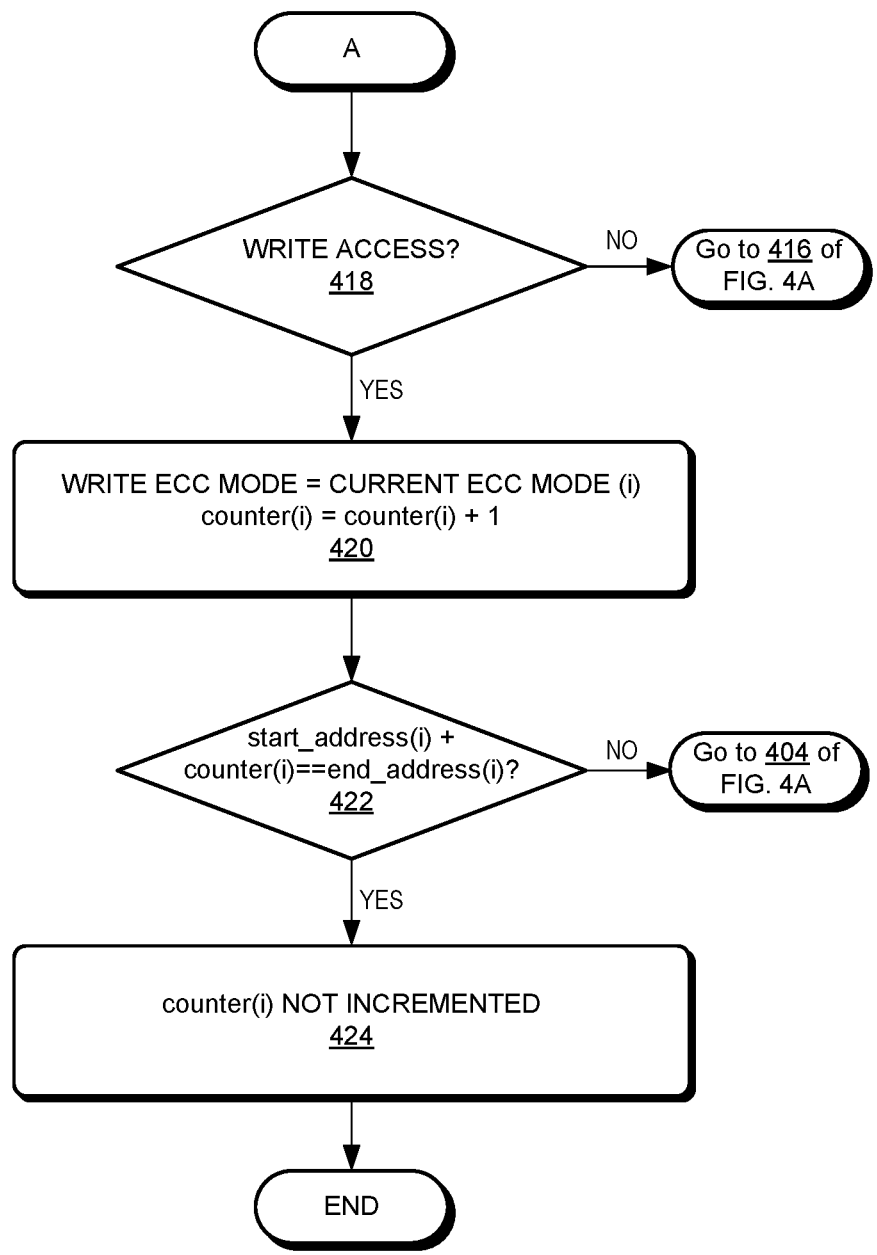
FIG. 4B is a continuation of FIG. 4A, in accordance with an embodiment of the present disclosure.

FIG. 4B is a continuation of flowchart 400 in FIG. 4A, in accordance with an embodiment of the present disclosure. When the system determines that the condition in 414 is satisfied then the system may further determine if the current address is associated with a write operation (operation 418). If the condition in 418 is true then the system may set the write ECC mode to the current ECC mode specified in the $i^{th}$ entry of the ECC mapping table (operation 420). The system may also increment counter(i) by 1 (operation 420), indicating that range of the memory using the current ECC mode is expanded by one cache block. The system can stop incrementing the counter(i) value when: start_address(i)+counter(i)=end_address(i) (operation 422 and 424). When the condition in 422 is not true then the system may return to operation 404. If the condition in 418 is not true then the system can perform operation 416 and the counter(i) is kept unchanged. Note that while the comparisons and other operations shown in FIG. 4A and FIG. 4B appear to be serialized, they can be carried out in parallel in hardware. Therefore, the additional latency introduced by the system (ECC mode controller) is negligible.

Figure 5A:
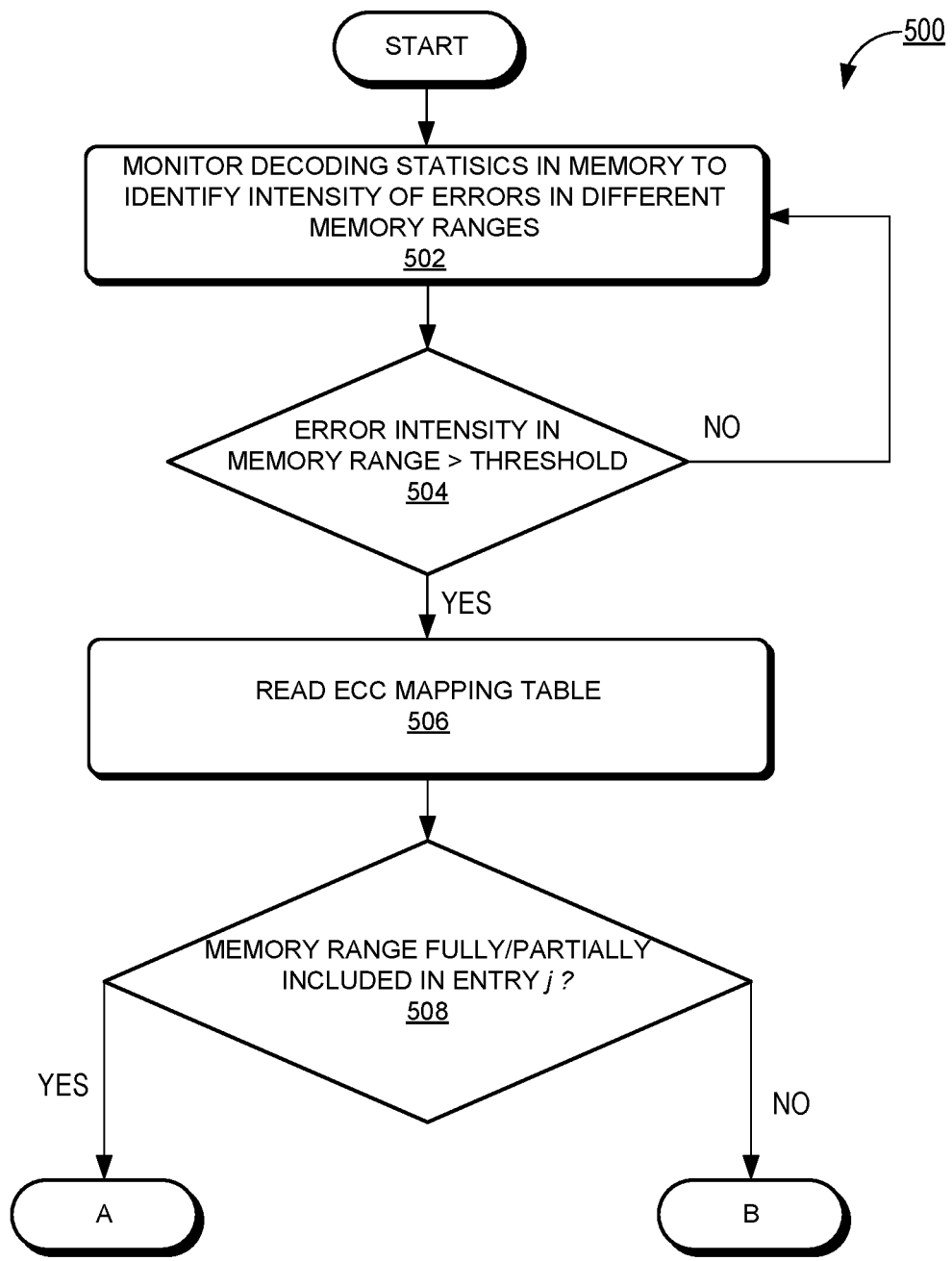
FIG. 5A presents a flowchart illustrating an exemplary process for performing elastic error correction in memory by applying memory scrubbing and ECC mapping table update, in accordance with an embodiment of the present disclosure.

FIG. 5A presents a flowchart 500 illustrating an exemplary process for performing error correction in memory by applying memory scrubbing and ECC mapping table update, in accordance with an embodiment of the present disclosure. During operation, the operating system may periodically monitor the ECC decoding statistics to identify an intensity of the soft errors in different memory ranges (operation 502). The operating system (OS) may use predetermined thresholds, $T_i$, for transitioning between ECC mode i−1 and ECC mode i, where i is an integer and i∈[1,3].

During the process of monitoring the ECC decoding statistics, if the OS detects that an error intensity in a memory range of [start_address, end_address] is greater than threshold, $T_i$, (operation 504) then the OS may first read the ECC mapping table (operation 506) with a read instruction, e.g., rdmsr (read from Model Specific Register). When the OS determines that the address range [start_address, end_address] has been fully or partially included in an entry j of the ECC mapping table (operation 508), then the OS may infer that a current ECC mode in entry j may not be strong enough to address an increase of the soft errors in the near future.

Figure 5B:
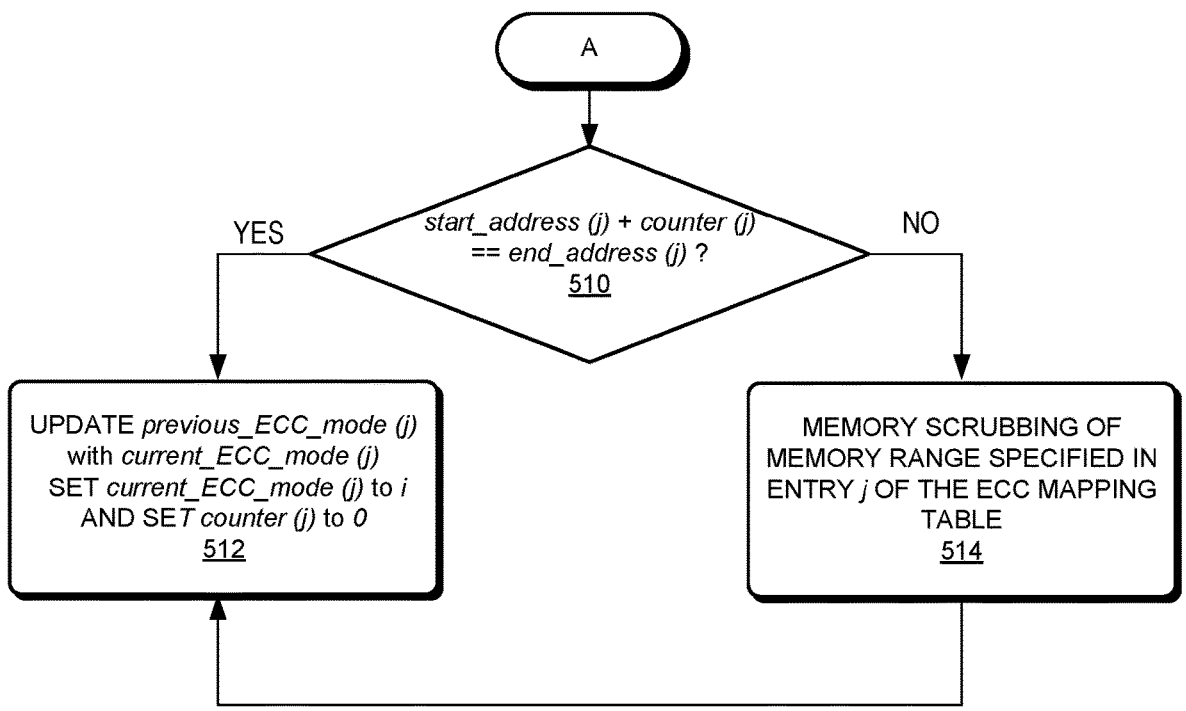
FIG. 5B is a continuation of FIG. 5A, in accordance with an embodiment of the present disclosure.
Figure 5C:
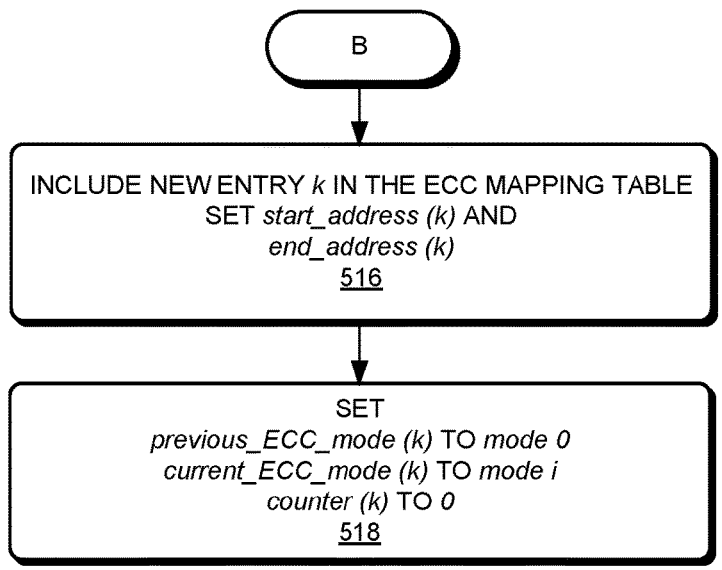
FIG. 5C is a continuation of FIG. 5A, in accordance with an embodiment of the present disclosure.

The next steps are shown in FIGS. 5B and 5C which are a continuation of FIG. 5A. Operation 510 in FIG. 5B indicates that the OS may further check if the memories specified in entry j of the ECC mapping table has been completely protected by an ECC mode specified in the current ECC mode field of entry j. Specifically, in operation 510, the OS may compare start_address(j)+counter(j) with end_address(j). If they are equal, then the OS may update the different fields in entry j of the ECC mapping table (operation 512) as follows: previous_ECC_mode(j)=current_ECC_mode(j); current_ECC_mode(j)=i; and counter(j)=0. The previous_ECC_mode(j), current_ECC_mode(j), and counter(j) correspond to the previous_ECC_mode field, current_ECC_mode field, and the counter field, respectively, in the $j^{th}$ entry of the ECC mapping table.

However, when start_address(j)+counter(j) and end_address(j) are not equal, then the OS may prioritize a memory scrubbing process to complete scrubbing the memory region specified in the entry j of the ECC mapping table (operation 514). After the OS completes the memory scrubbing operation 514, it can perform operation 512.

FIG. 5C is a continuation of FIG. 5A, in accordance with an embodiment of the present disclosure. Note that the start_address and the end_address in each entry in the ECC mapping table is kept unchanged. However, when the OS determines that the condition specified in 508 are not satisfied, i.e., the memory ranges specified in the ECC mapping table can be outside of the input address range. In this case, the OS may update the ECC mapping table by adding a new entry k to the ECC mapping table. Specifically, in the new entry k a corresponding start_address(k) and end_address(k) is set to a new address range; previous_ECC_mode(k) is set to mode 0; the current_ECC_mode (k) is set to mode i; and counter(k) is set to 0 (operations 516 and 518).

In one embodiment of the present disclosure, number entries in the ECC mapping table could be 3, 4, or more depending on the number of regions with different ECC modes the system can support simultaneously. However, if the number of entries is allowed to exceed beyond the threshold value, then this may unnecessarily increase the hardware complexity and may affect the other mechanisms in the system that are designed to increase the DRAM reliability.

The OS can reserve one ECC mapping table entry for the purpose of merging multiple entries to one entry. When memory ranges specified in two entries are within a certain threshold distance in memory then these two entries can be selected for merging. Next, the OS may determine if a selected entry in the ECC mapping table is fully protected with a same ECC mode as that used in other entries with neighboring memory ranges. Further, these entries may have the same settings as indicated in (operations 516 and 518 of FIG. 5C). The OS may then merge all these entries into one entry in the ECC mapping table. Therefore, by including a mechanism for merging table entries, the system can prevent the number of table entries from increasing beyond a threshold value.

To summarize, FIGS. 5A-5C illustrate a typical scenario when elastic ECC process is in operation. Specifically, when the error correction method is in operation, the operating system may periodically monitor the ECC decoding statistics to identify an intensity of the soft errors. If the intensity of the soft errors in a certain memory address range is above a certain threshold, then the operating system may anticipate that the DRAM in that address range can be susceptible to soft errors. Therefore, the system may take proactive actions by applying a stronger multi-bit error correction code to prevent any likely data corruption in the near future. Other proactive actions taken by the system can include: disabling and mapping out problematic DRAM DIMM, or migrating applications to a different node even before the soft errors in memory reaches beyond the error correction capability of ECC-6. Furthermore, the system is capable of achieving elasticity on ECC by providing the flexibility of mapping ECCs with various strengths, i.e., ECC modes, to ranges of DRAM addresses without incurring any overhead on memory capacity.

In addition, the system can be capable of allowing the co-existence of traditional SECDED ECC with different ECC modes at 64 byte data block granularity. The system is also capable of providing a better fine-grained and smooth trade-off between different ECC modes and memory access latency overhead than the known ECC techniques.

Exemplary Computer System and Apparatus

Figure 6:
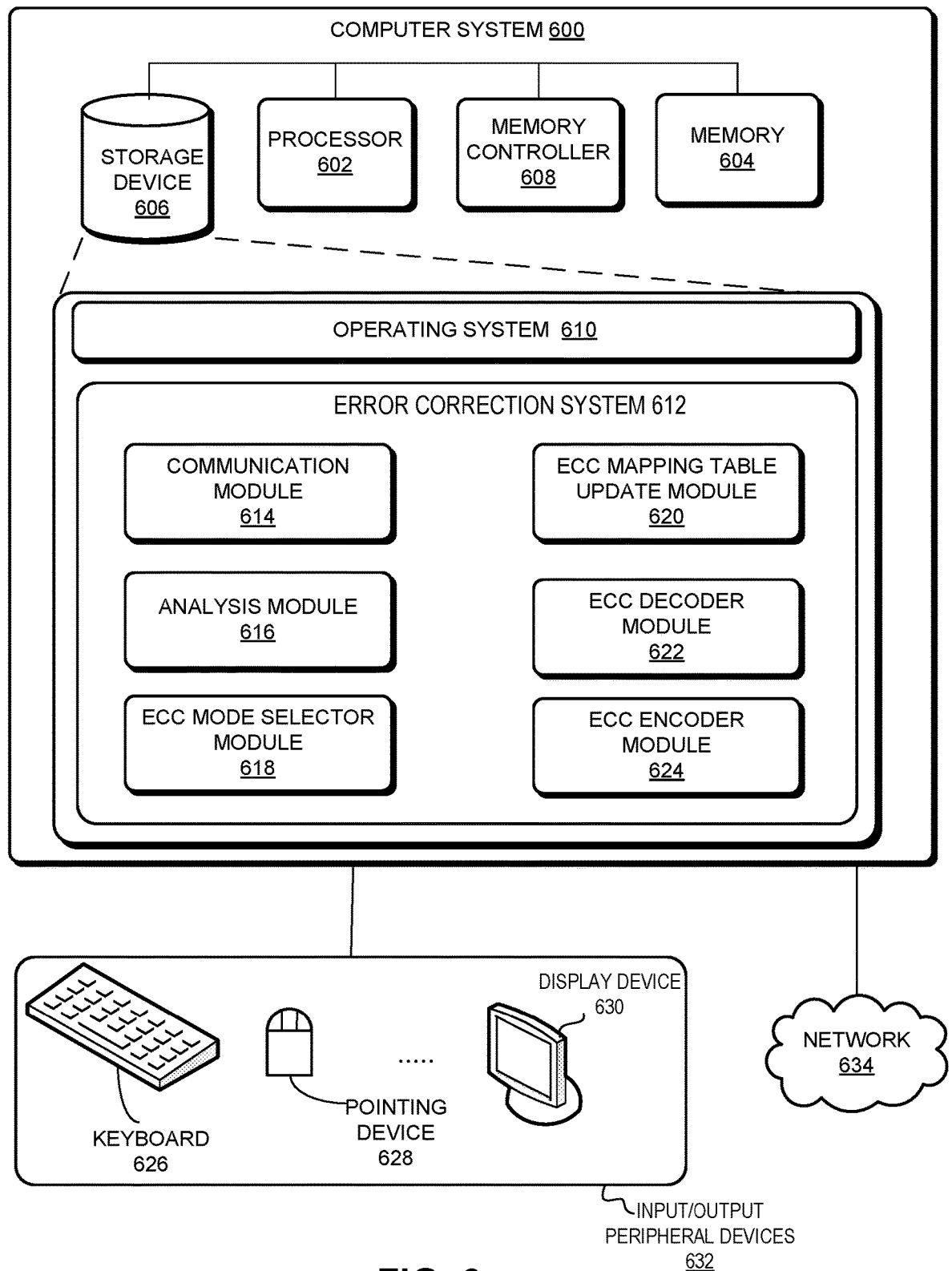
FIG. 6 illustrates an exemplary computer system that facilitates elastic error correction in memory, according to one embodiment of the present disclosure.

FIG. 6 illustrates an exemplary computer system that facilitates elastic error correction in memory, according to one embodiment of the present disclosure. Computer system 600 includes a processor 602, a memory 604, a storage device 606, and a memory controller 608. Computer system 600 can be coupled to a plurality of peripheral input/output devices 632, e.g., a display device 630, a keyboard 626, and a pointing device 628, and can also be coupled via one or more network interfaces to network 634. Storage device 606 can store an operating system 610 and an error correction system 612.

In one embodiment, error correction system 612 can include instructions, which when executed by processor 602 can cause computer system 600 to perform methods and/or processes described in this disclosure. During operation of computer system 600, error correction system 612 can include instructions for receiving memory access request including a current address and a RD/WR command (communication module 614). Error correction system 612 may further include instructions for analyzing the current address by comparing the current address with each entry in an ECC mapping table to determine whether the current address belongs to any of the address ranges specified in the ECC mapping table (analysis module 616). Error correction system 612 may then select an appropriate ECC mode based on a result of the comparison performed in analysis module 616 (ECC mode selector module 618).

Error correction system 612 may further be configured to update or program the ECC mapping table (ECC mapping table update module 620). Based on the selected ECC mode and an entry in the ECC mapping table, error correction system 612 may generate read ECC mode bits for a read command or write ECC mode bits for a write command. Error correction system 612 may use these read ECC mode bits for decoding data (ECC decoder module 622) and write ECC mode bits encoding data (ECC encoder module 624), respectively. In some embodiments, modules 614-624 can be partially or entirely implemented in hardware and can be part of the processor 602.

Figure 7:
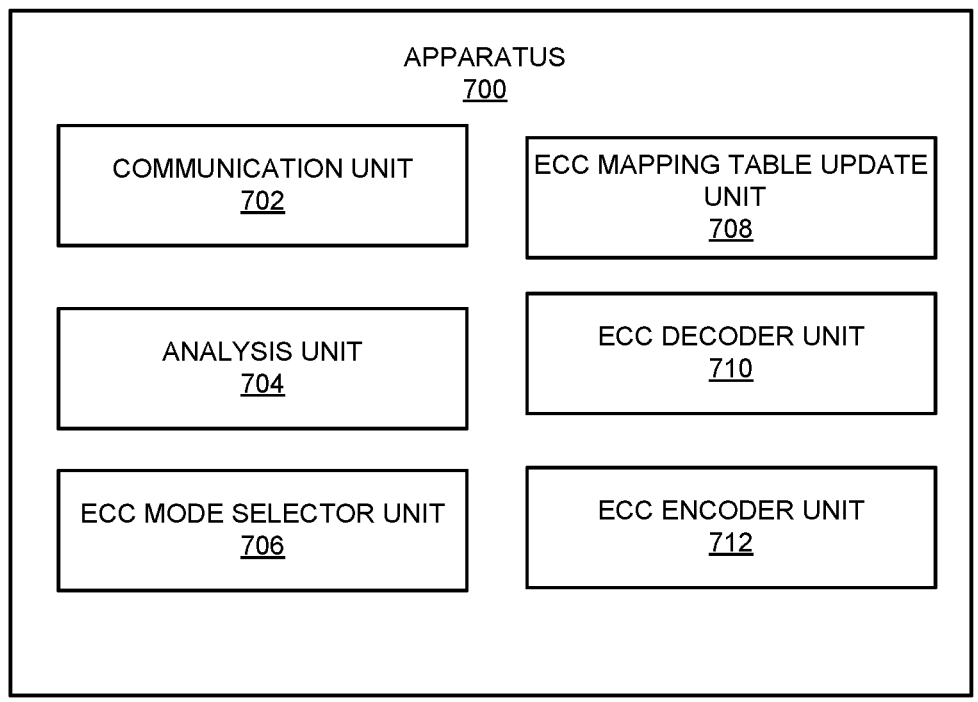
FIG. 7 illustrates an exemplary apparatus that facilitates elastic error correction in memory, according to one embodiment of the present disclosure.

FIG. 7 illustrates an exemplary apparatus that facilitates elastic error correction in memory, according to one embodiment of the present disclosure. Apparatus 700 can comprise a plurality of units or apparatuses that may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-712, which perform functions or operations similar to modules 614-624 of computer system 600 of FIG. 6, including: a communication unit 702, an analysis unit 704, an ECC mode selector unit 706, an ECC mapping table update unit 708, an ECC decoder unit 710, and an ECC encoder unit 712.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A method for performing error correction in memory, comprising:
    receiving a memory access request from a host processor;
    comparing a memory address specified in the memory access request with a set of entries in an error correction code (ECC) mapping table;
    determining that the memory address corresponds to at least one entry in the ECC mapping table,
        determining whether the memory address belongs to a first portion or a second portion of the address range specified in the ECC mapping table entry;
        in response to the memory address belonging to the first portion and not being the last address in the first portion, selecting a first ECC mode;
        in response to the memory address being the last address in the first portion and the memory access request being a write request selecting the first ECC mode, and indicating that a range of memory using the first ECC mode is expanded by one cache block; and
        selecting a second ECC mode in response to the memory address belonging to the second portion; and
    processing the memory access request based on the selected ECC mode.

2. The method of claim 1, wherein each entry in the ECC mapping table includes:
    a start address field;
    an end address field;
    a previous ECC mode field;
    a current ECC mode field; and
    a counter field.

3. The method of claim 1, wherein the second ECC mode and the first ECC mode use a class of cyclic error correcting codes that is capable of performing at least one of:
 a 4-bit error correction and 5-bit error detection;
 a 5-bit error correction and 6-bit error detection; and
 a 6-bit error correction and 7-bit error detection.

4. The method of claim 1, wherein a counter field in the ECC mapping table entry tracks a boundary separating the address range into two regions: the first portion of the address range and the second portion of the address range, and wherein the address range is defined by a start address and an end address specified in the ECC mapping table entry.

5. The method of claim 1, wherein the memory includes a dynamic random access memory (DRAM).

6. The method of claim 1, wherein in response to the memory address being the last address in the first portion and the memory access request being a write request updating the ECC mapping table by:
 setting a write ECC mode to the first ECC mode; and
 incrementing a value in a counter field of the ECC mapping table entry.

7. The method of claim 1, further comprising:
 in response to determining that the memory address is not included in the ECC mapping table, selecting a default ECC mode.

8. The method of claim 7, wherein the default ECC mode represents a Hamming code with 64 bits data and 8 bit parity code.

9. A system for performing error correction in memory, comprising:
 a receiving module configured to receive a memory access request from a host processor, wherein the memory includes a dynamic random access memory (DRAM);
 an analysis module configured to:
  compare a memory address specified in the memory access request with a set of entries in an error correction code (ECC) mapping table; and
  determine that the memory address corresponds to at least one entry in the ECC mapping table;
  determine whether the memory address belongs to a first portion or a second portion of the address range specified in the ECC mapping table entry;
 an ECC mode selector module configured to:
  in response to the memory address belonging to the first portion and not being the last address in the first portion selecting the first ECC mode;
  in response to the memory address being the last address in the first portion and the memory access request being a write request selecting the first ECC mode, and indicating that a range of memory using the first ECC mode is expanded by one cache block; and
  select a second ECC mode in response to the memory address belonging to the second portion; and
 a processing module configured to process the memory access request based on the selected ECC mode.

10. The system of claim 9, wherein each entry in the ECC memory mapping table includes:
 a start address field;
 an end address field;
 a previous ECC mode field;
 a current ECC mode field; and
 a counter field.

11. The system of claim 9, wherein the second ECC mode and the first ECC mode use a class of cyclic error correcting codes for performing at least one of:
 a 4-bit error correction and 5-bit error detection;
 a 5-bit error correction and 6-bit error detection; and
 a 6-bit error correction and 7-bit error detection.

12. The system of claim 9, wherein the ECC mode selector module is further configured to:
 select a default ECC mode in response to determining that the memory address is not included in the ECC mapping table.

13. The system of claim 9, wherein a counter field in the ECC mapping table entry tracks a boundary separating the address range into two regions: the first portion of the address range and the second portion of the address range, and wherein the address range is defined by a start address and an end address specified in the ECC mapping table entry.

14. The system of claim 9,
 wherein an ECC mapping table update module is configured to update the ECC mapping table in response to determining that the memory access request is the write request by:
  setting a write ECC mode to the first ECC mode; and
  incrementing a value in the counter field of the ECC mapping table entry.

15. An apparatus for performing error correction in memory, comprising:
 one or more processors; and
 a storage medium storing instructions that, when executed by the one or more processors, cause the apparatus to perform a method comprising:
  monitoring error correction code (ECC) decoding statistics to determine intensity of soft errors in different address ranges in memory; and
  in response to determining that intensity of soft errors in an address range is greater than a corresponding threshold:
   reading an ECC mapping table; and
   in response to determining that the address range is fully or partially included in an entry of the ECC mapping table,
    prioritizing memory scrubbing when the address range is not completely protected with a current ECC mode specified in a current ECC mode field of the entry in the ECC mapping table; and
    updating a previous ECC mode field in the entry of the ECC mapping table with the current ECC mode.

16. The apparatus of claim 15, further comprising:
 setting, based on the threshold, the current ECC mode field to a new mode, wherein the new mode has a higher strength than the mode in the updated previous ECC mode field; and
 resetting a counter field in the entry of the ECC mapping table.

17. The apparatus of claim 15, the method further comprising:
 in response to determining that the address range is not included in any entry of the ECC mapping table,
  adding a new entry to the ECC mapping table;
  setting a previous ECC mode field in the new entry to a default mode;
  setting, based on the threshold, the current ECC mode field in the new entry to a new mode, wherein the new mode has higher strength than the default mode; and resetting a counter field in the entry of the ECC mapping table.

18. The apparatus of claim 15, wherein each entry in the ECC mapping table includes:
- a start address field;
- an end address field;
- a previous ECC mode field;
- the current ECC mode field; and
- a counter field.

19. The apparatus of claim 15, wherein the memory includes a dynamic random access memory (DRAM).

20. The apparatus of claim 15, wherein the threshold being a first threshold, a second threshold, or a third threshold; and wherein:
- when the intensity of soft errors exceeds the first threshold the current ECC mode field is set to mode 1;
- when the intensity of soft errors exceeds the second threshold the current ECC mode field is set to mode 2; and
- when the intensity of soft errors exceeds the third threshold, the current ECC mode field is set to mode 3.

* * * * *